(12) United States Patent
Glent-Madsen et al.

(10) Patent No.: US 6,846,082 B2
(45) Date of Patent: Jan. 25, 2005

(54) REAR-PROJECTING DEVICE

(75) Inventors: Henrik Glent-Madsen, Låsby (DK);
Søren Christoph Meyer, Viby (DK);
Kim Niels Raahauge, Hornslet (DK)

(73) Assignee: Dicon A/S (DK)

( * ) Notice: Subject to any disclaimer, the term of this patent is extended or adjusted under 35 U.S.C. 154(b) by 0 days.

(21) Appl. No.: 10/181,519

(22) PCT Filed: Jan. 22, 2001

(86) PCT No.: PCT/DK01/00047

§ 371 (c)(1),
(2), (4) Date: Nov. 13, 2002

(87) PCT Pub. No.: WO01/53879

PCT Pub. Date: Jul. 26, 2001

(65) Prior Publication Data

US 2003/0151727 A1 Aug. 14, 2003

(30) Foreign Application Priority Data

Jan. 21, 2000 (EP) ............................................ 00200237

(51) Int. Cl.⁷ .............................................. G03B 21/14
(52) U.S. Cl. ............................. 353/94; 353/30; 362/559
(58) Field of Search ............................... 353/30, 94, 122;
345/44, 46, 82; 362/551, 554, 555, 559;
349/62

(56) References Cited

U.S. PATENT DOCUMENTS

| 4,839,635 | A | * | 6/1989 | Harris et al. .................. 345/55 |
| 5,053,765 | A | * | 10/1991 | Sonehara et al. ...... 340/815.43 |
| 5,408,572 | A | | 4/1995 | Kriege |
| 5,465,315 | A | * | 11/1995 | Sakai et al. .................. 385/116 |
| 5,838,865 | A | * | 11/1998 | Gulick ......................... 385/121 |
| 6,318,863 | B1 | * | 11/2001 | Tiao et al. .................... 353/31 |
| 6,418,267 | B1 | * | 7/2002 | Lowry ........................ 385/147 |
| 6,508,571 | B2 | * | 1/2003 | Chuang ....................... 362/237 |
| 2002/0002832 | A1 | * | 1/2002 | Krauter ....................... 62/180 |

FOREIGN PATENT DOCUMENTS

| EP | 0 350 465 | 1/1990 |
| EP | 0 467 034 | 1/1992 |
| WO | WO 90 13833 | 11/1990 |
| WO | WO 98 47042 | 10/1998 |
| WO | WO 98 47048 | 10/1998 |

* cited by examiner

*Primary Examiner*—William C. Dowling
(74) *Attorney, Agent, or Firm*—Cantor Colburn LLP

(57) ABSTRACT

The invention relates to a rear-projecting device including a light guide for distribution of light from a light source to a light projecting area, a spatial light modulating arrangement, the light modulating arrangement is arranged in relation to the light-projecting area such that the arrangement illuminates a sub-area of the light-projecting area, the light projection area is at least partly transparent.

17 Claims, 8 Drawing Sheets

REAR-PROJECTING DEVICE

FIELD OF THE INVENTION

The invention relates to a rear-projecting device and, particularly, to a rear-projecting device for illuminating an area of a light projecting area.

BACKGROUND OF THE INVENTION

An example of a rear-projecting device is within the technical area of traffic signs.

The area of traffic signs represents a technical area within which many attempts to modernize the traditional signing have more or less failed due to various circumstances.

Hence, the traditional mechanically based traffic sign having one static painted signaling surface represents the dominating traffic sign of today.

Nevertheless, several attempts of breaking the dominance of the above-mentioned technique have been made due to the fact that an effective variable traffic sign would provide immense improvements in regard to traffic control.

One of the frequently used types of variable traffic signs comprises small rotatable mechanical elements having e.g. three different surfaces, each surface being dedicated to a certain sign. Thus, a sign may change between three different sign states by means of synchronous rotating of the sign element. Such signs represent a well-proven technique providing a visual quality comparable with standard traditional traffic signs. However, the sign is quite restricted with respect to other variations.

Another type of a variable traffic sign is represented by signs having a plurality of light sources spread all over a signaling surface. The light sources may e.g. comprise small lamps or light emitting diodes (LEDs). Such signs represent a technique having a very high degree of variation as the number of possible variations is only restricted by the resolution of the sign. However, due to the very discrete, low-dense positioning of light sources, this type of sign has found very little use within the area of traffic signs with the exception of traffic signs having quite few "high power" light sources, and consequently a few possible variations due to low resolution problems. Moreover, a sign of this type becomes extremely expensive, when growing in dimensions.

Another serious problem related to the prior art projecting devices is that a very large amount of illumination power is required over a homogenous projecting area.

Thus, a rear projection device having a large degree of variation combined with large dimensions is desired.

BRIEF SUMMARY OF INVENTION

The invention relates to a rear projecting device including light guides for distribution of light from at least one light source to a light-projecting area via at least two spatial light modulator arrangements, the light modulating arrangements being arranged in relation to the light-projecting area in such a manner that each of the arrangements illuminates a sub-area of the light-projecting area, the light projection area being at least partly transparent.

The rear-projecting device of the invention features a high degree of efficiency and a compact design due to the distribution of the modulating arrangements which may be arranged relatively close to the projection area.

When arranging the modules at a mutual distance, the magnification needed for obtaining illumination of a pre-defined area may be reduced. Reducing the total magnification results in a reduction of luminance per projection area on the projection screen. Furthermore, the obtained reduction of distance between modules and the projection area results in a larger degree of compactness. The latter is of great importance when designing rear-projecting devices in the form of outdoor projectors such as traffic signs, score boards advertising projectors or the like.

A low-loss system obtained according to the invention is a particularly important feature when remembering that rear-projecting devices are real-time projecting systems. The required optical energy of each pixel of the projecting area has to be established almost instantaneous in typical projecting applications.

A further advantage of the invention is that the light guide separation between the projection area and the light source (s) offers the possibility of high standard maintenance as the light source(s) may be located at an easily accessible position.

It should be noted that an easily accessible light source is of great importance during normal maintenance as the light source and the supporting circuitry are the most vulnerable and service-requiring parts of the projecting system. Moreover, an outdoor system such as a traffic sign is usually inaccessible as it is e.g. elevated substantially across intersections/highways. Hence, a remote positioning of the light source favors service personnel and engineers.

Moreover, alignment and calibration may be performed in two separate processes. The light guides may be calibrated with respect to the light modulating modules in a lab allowing the fitting personnel to subsequently calibrate the light source system to the input end of the light guides.

A further feature of the embodiment of the invention is that traditional replacement of the light source may be performed by low-skilled service personnel.

A further feature of the invention is that the utilization of light guides offers the possibility of sharing one light source between all modules of the system. Hence, the light may be distributed uniformly towards the involved modules. Basically, this feature means that complicated calibrations may be performed in a lab as homogeneous distribution may be obtained and calibrated by means of a proper design of the light guide system between the light source and the light modulating modules.

In another embodiment, the invention relates to a rear projecting device including light guides for distribution of light from at least one light source to a light-projecting area via at least one spatial light modulator arrangement, the light modulating arrangement being arranged in relation to the light-projecting area in such a manner that the arrangements illuminates an area of the light-projecting area, the light projection area being at least partly transparent.

According to the invention, the device offers very advantageous modular features, as the light source(s) may be separated from the modulating arrangements and the projection areas in such a manner that the light source and the light-projecting components constitute two separate parts of the system which may be designed and calibrated more or less individually.

Moreover, a specific problem of projecting devices such as traffic signs is that they suffer from a very restricted serviceability of especially the projecting system, as this system should obviously be located as close as possible to the projection surface.

The invention offers the possibility of advantageous arranging of the light source away from e.g. traffic. Hence, maintenance of the most vulnerable part of the system may be supported and made easier by the system design.

Is should be noted that the life-span of the light source should be expected to be significantly lower than any other part of the system.

The light guides comprise optical fibers, preferably multi-mode fibers. When using multi-mode fibers, the system may easily be adapted to multi-color applications. Moreover, more traditional broadband light sources may be applied.

The light-projecting area comprises at least two screens.

When dividing the projecting screen into several separate screens, the optical properties of the individual screens may be optimized with respect to the corresponding spatial light modulating arrangements, as e.g. expansion of the screens due to temperature variations may be restricted to the individual screens instead of the whole projecting area. It should be noted that the projection screen has optical properties which should be carefully fitted to each spatial light modulator arrangement.

The light-projecting area is protected by means of a protective screen.

As the preferred material of the light projection areas is acrylics which is relatively vulnerable to ambient conditions, the protective screen contributes to increasing the life span of the otherwise sensitive light projection area. Moreover, the protective screen serves as an encapsulation of the sign or the module.

The light from the light source is distributed to said light guides via a mixing rod in such a manner that at least two light guides, preferably each light guide, essentially receive the same amount of light. The mixing rod represents a cost-effective and simple solution to the problem of obtaining screen projection without significantly visible, disturbing borderlines between the illumination points of the different modules.

Thus, ideally, every indication of undesired borderlines may be suppressed once and for all when manufacturing the front-end of the projecting system. Service personnel may thus concentrate on only one type of calibration during the everyday maintenance, i.e. the calibration needed between the light source means and the light guides.

Utilizing a mixing rod is advantageous when applying several light guides or optical fibers, preferably more than 8.

The light from the light source is distributed to said light guides via a filter means in such a manner that at least two light guides, preferably each light guide, essentially receive the same amount of light.

A filter may e.g. be an intensity shaping filter.

The spatial light modulating arrangements comprises a micro-mechanical transmissive shutter array. Transmissive shutter arrays offer a high degree of liability, freedom and flexibility in the shutter design and are thus extremely efficient.

Another feature of transmissive shutters is the robust nature of a "2D" modulator.

At least one of the spatial light modulator arrangements comprises a DMD light modulator. Thus, DMD may be adapted to the system at relatively low cost. Of course, the optical system should be adapted accordingly.

The light source comprises a short arc lamp, a further advantageous embodiment of the invention has been obtained. A short arc lamp offers the possibility of injecting high optical power into the system, as the light source has to be fitted to the single shutters of the utilized shutter array.

The light source comprises an arc of less than 3 mm, preferably less than 2 mm.

When utilizing low area hotspot light sources i.e. high luminance sources, high luminous flux (power) may be injected into the shutter modules, even when low area modulation areas of the single shutters are applied.

Consequently, when applying small dimensions of the modulation channels in e.g. transmissive shutters, it is necessary to use a lamp with a low etendue to optimize the collection efficiency. Hence, when applying the above-mentioned light sources, the emitted luminous flux per unit solid angle per unit area is maximized.

The choice of light source with respect to the arc should match the system carefully. Hence, when using relatively few light guides, e.g. eight or fewer optical fibers, between the light source and the modulating arrays, the arc should be less than 1.5 mm while the arc should be between approximately 1.5 mm and 2.8 mm when dealing with more than eight optical fibers.

The luminance of light modulated by at least one of the spatial light modulator arrangements is controlled by means of a variation in duty cycle.

The rear projecting device comprises a traffic sign.

In another embodiment, the invention relates to a rear-projecting device including a plurality of light emitters arranged for illumination of a light-projecting area comprising a front side and a rear side via at least two spatial light modulator arrangements, the light modulating arrangements being arranged in relation to a light-projecting area in such a manner that each of said arrangements illuminates a sub-area of the light-projecting area, the light-projecting area being at least partly transparent.

The light emitters, in one embodiment, are light sources. In this manner, the light sources may be dedicated to different sub-areas of the projection area and create an advantageous way of establishing the necessary light power.

In still another embodiment, the invention relates to a rear projecting device having at least one light input, at least one spatial light modulator arrangement and a light projecting area, the spatial light modulator arrangement including at least one spatial light modulators, the spatial light modulator including a plurality of electrically controllable shutters controlling the projecting of light to an effective light projecting area, the spatial light modulating arrangement having a modulator dimension D in a given direction of the arrangement, said effective light projecting area having a projecting dimension of the projected light in a corresponding direction, the modulator dimension D being the maximum distance between two shutters of the modulator arrangement in the said direction, where D>d/20 and preferably greater than d/4.

When distributing the individual shutters over a relatively large area, a high luminance is obtained over the effective modulating area.

Moreover, the projection distance between the spatial light modulating and the light projecting area may be minimized.

In a advantageous embodiment, D>6 cm and D is the minimum extension of the spatial modulating arrangement.

Hence, when dealing with larger modulating arrangements, the distribution of the individual shutters should be increased correspondingly.

BRIEF DESCRIPTION OF DRAWINGS

The invention will be described below with reference to the drawings of which

DETAILED DESCRIPTION OF INVENTION

Figures 1A, 1B:
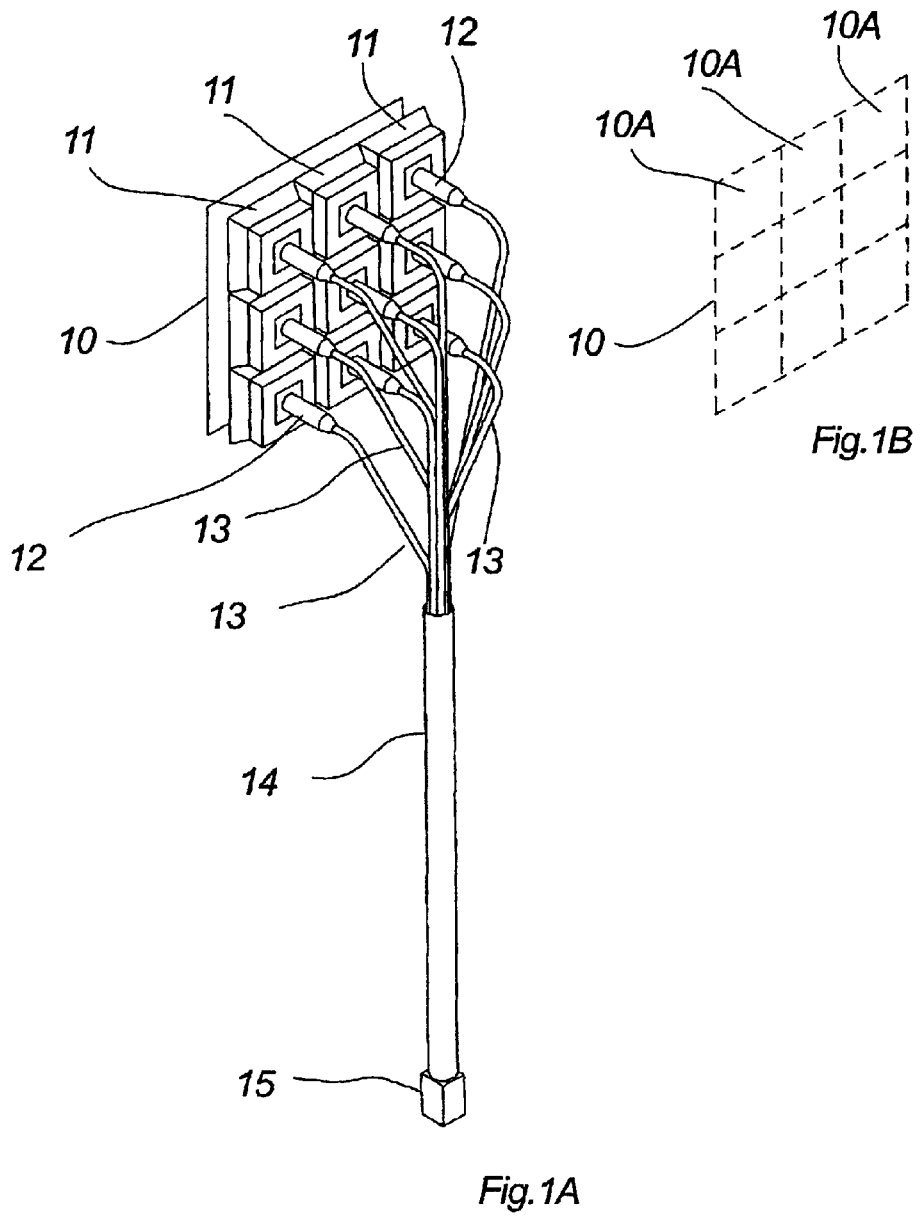
FIG. 1A shows an isometric view of a rear-projecting arrangement according to the invention.
FIG. 1B illustrates the sub-projection areas of the sign screen of FIG. 1A.

Initially, some of the basic features of the invention will be described with reference to FIGS. 1A, 1B, 2A and 2B.

Subsequently, a preferred embodiment of the invention will be described with reference to FIGS. 3 to 5.

FIG. 1 shows a preferred embodiment of a rear-projecting arrangement according to the invention. The shown rear-projecting arrangement comprises a light receiving mixing rod 15. The mixing rod 15 is optically coupled with a bundle of optical fibers 13. Each of the optical fibers 13 comprises a light-emitting end in the form of an optical plug 12. Each of the plugs 12 is fixated for illumination of a spatial light modulating array (not shown) incorporated in a housing 11. The housings 11 are all arranged in fixed positions in relation to a transparent display 10.

It should be noted, that the mixing rod is optional and preferably applied when dealing with several light guides.

The display comprises a Fresnel lens and a diffuser (not shown).

The basic function of the rear-projecting system is the light receiving mixing rod adapted to receiving light from a light source. Light received from the said light source is distributed via the optical fibers 13 to a light-emitting end of the optical fiber. The light-emitting end forms an optical plug 12 in a fixed position relative to the housings 11. Each housing 11 comprises a spatial light modulating array arranged in such a manner that light emitted from the optical plug is distributed uniformly over the light modulators of the spatial light modulator array. The spatial light modulating array is controlled by means of controlling signals established by a control signal input (not shown) of the housing 11.

The housings 11 are combined in an illuminating arrangement of light modulators. Each arrangement of light modulators illuminates part of an illumination area, and the illumination subparts are combined into one common illumination area.

The illumination of each sub-area is controlled by appropriate programming of a control unit. The control unit itself may be controlled by remote.

It should be noted that the light source (not shown) may be located at a distance from the rear-projecting screen.

It should moreover be noted that the rear-projecting device is particularly advantageous with respect to traffic signs, scoreboards or the like due the robustness of the construction.

Moreover, it should be noted that the invention provides a very slim projecting system, thus optimizing both the shape of the housing and the efficiency.

FIG. 1B illustrates the sub-projection areas of the sign screen of FIG. 1A.

Figure 2:
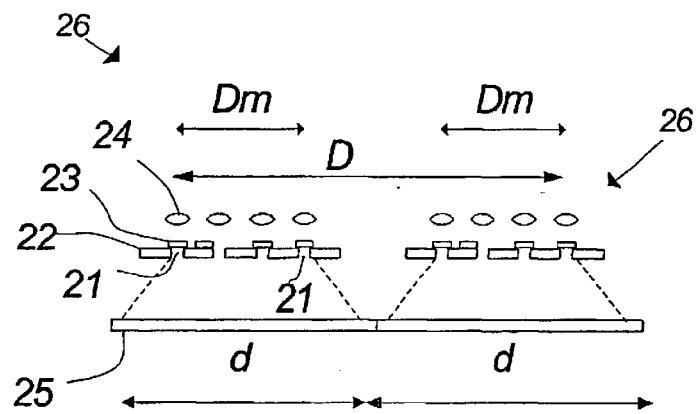
FIG. 2 illustrates the cross-section of a spatial shutter arrangement according to the invention.

FIG. 2 shows a cross-section of a spatial modulating arrangement of the invention applied in the aforementioned housing 11. The modulating arrangement has been simplified for illustrative purposes.

The shutter array comprises a plurality of holes 21 in a wafer 22. Each hole 21 has a corresponding electrically controlled shutter plate 23 having basically (at least) two positions; an open position and a closed position.

Light is guided through the hole by means of suitably designed injection optics, and the modulated light beams are projected into a transparent projecting screen 25 by means of suitably designed optics (not shown).

Figure 3A:
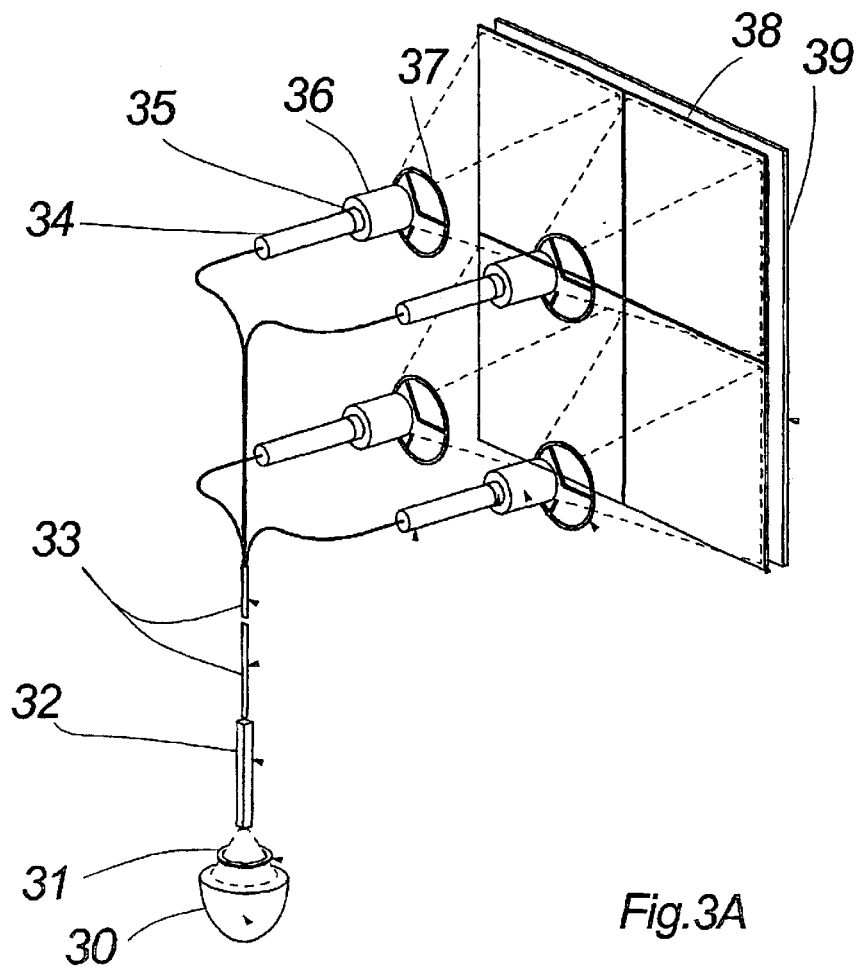
FIG. 3A shows an isometric view of a rear-projecting arrangement according to the invention.
Figure 3B:
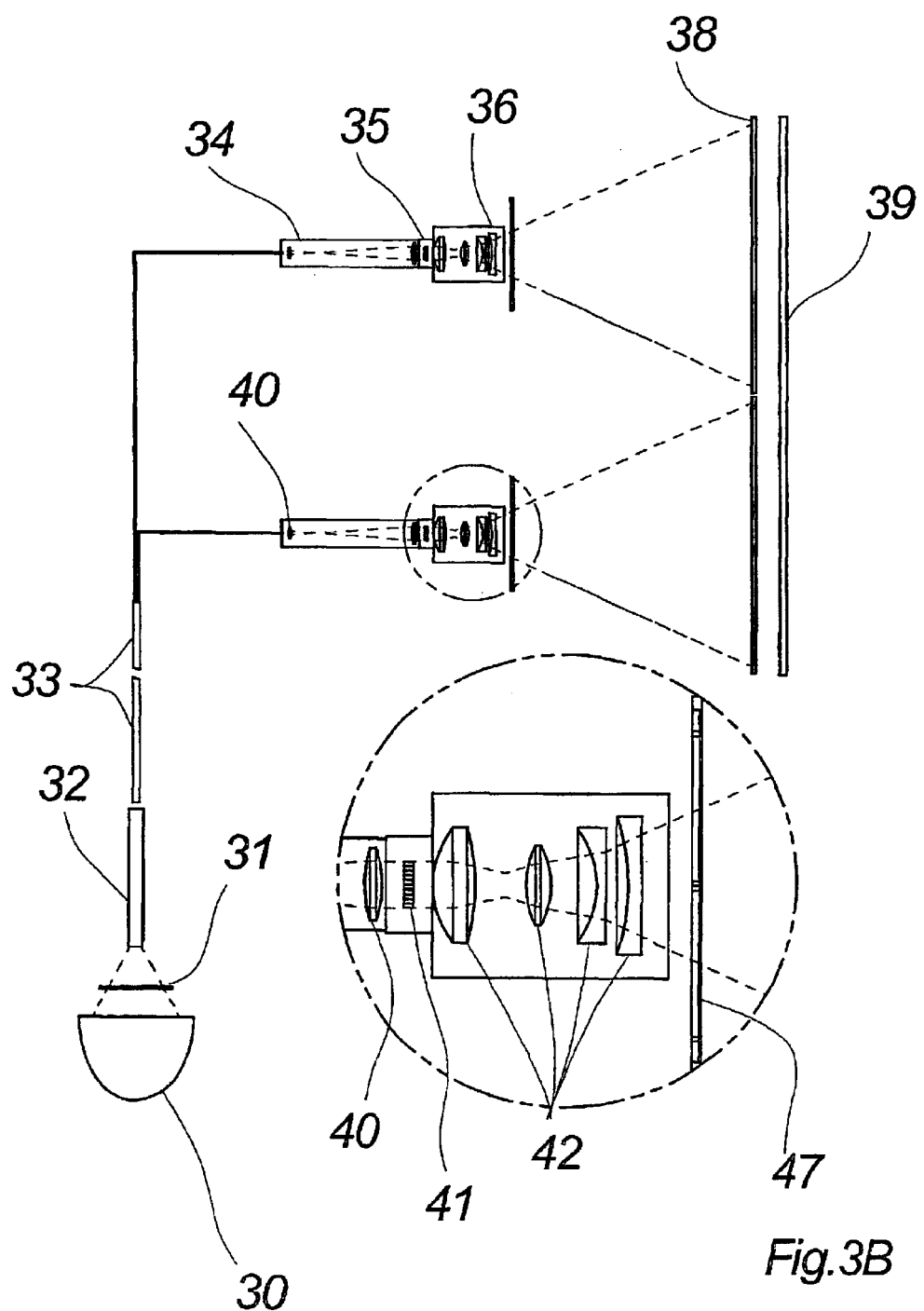
FIG. 3B shows a side view of a rear-projecting device according to the invention
Figure 4A:
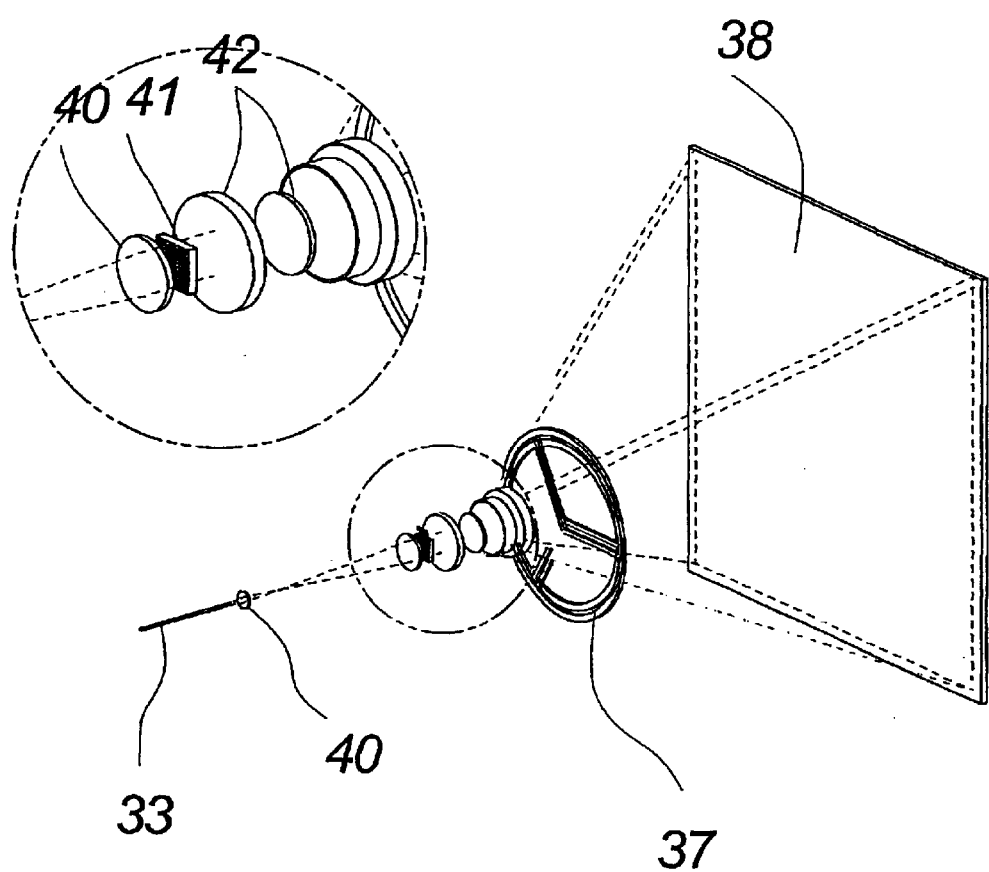
FIG. 4A illustrates the optical system of the rear-projecting device according to the invention.
Figure 4B:
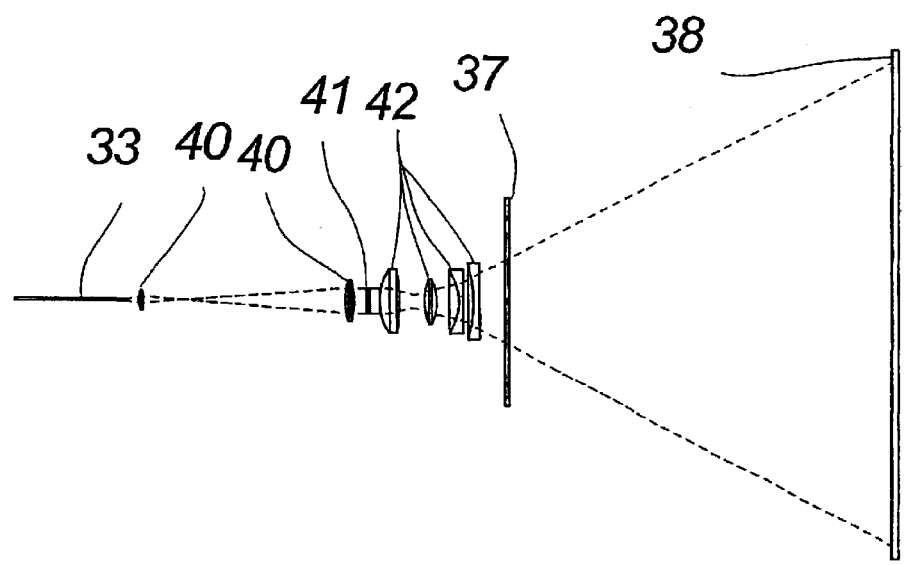
FIG. 4B shows a cross-section of a module of the optical system of FIG. 4A.

FIGS. 3A and 3B show a preferred embodiment of a rear-projecting arrangement according to the invention. Details of this projecting device are illustrated in FIG. 4A and FIG. 4B.

The shown rear-projecting arrangement comprises a light source 30. The light from the light source 30 is coupled with a light receiving mixing rod 32 through an optical filter 31. The illustrated light source is a short arc commercially available bulb. Other applicable light sources may be LED or laser sources.

The optical filter 31 is an IR/U-filter ensuring that the radiated light is within the desired interval of visible light. This filter may be integrated in the light source 30. The optical filter 31 may moreover compensate for the color of the light source if desired. A choice of light filter may be a GG 395 UV filter.

The choice of an appropriate light source is described with reference to FIG. 3B.

The mixing rod 32 is optically coupled with a bundle of optical fibers 33. Each of the optical fibers 33 comprises a light-emitting end in the form of an optical plug 34 with built-in injection optics 40. The injection optics will be described in detail at a later point. Each of the plugs 34 is fixated for illumination of a spatial light modulating array 41 incorporated in a housing 35.

The spatial light modulating array may be a transmissive micro-mechanical shutter array.

Another type of spatial modulator may be a DMD modulator.

The image formed by the light modulating array is projected onto a transparent screen 38 by a projection lens 42. The projection lens 42 is incorporated in a housing 36. The transparent screen 38 is provided with optical power and diffuser properties. The optical power provides suitable collimation on the rear side of the transparent screen 38 and the diffuser properties may be obtained by a simple, separate or integrated diffuser layer on the screen 38. The desired diffuser properties may e.g. be obtained suitable treatment of the screen surface. The illustrated system may moreover feature a protection screen 39 in order to offer protection against environmental exposure. Moreover, the illustrated embodiment may feature a motorized color wheel 37 with different color filters in order to produce color images on the screen 38. Evidently, if color modulation is desired, several other colors modulation techniques suitable for the modulating means may be applicable. It should be noted that a color wheel must be synchronized carefully with the control circuit (not shown) in order to obtain the right color at the right place and time.

Evidently, the color modulating system is optional, and it should be emphasized that other color modulating methods are applicable within the scope of the invention.

In some applications, the diffuser or the diffuser properties may be omitted.

The housings 34, 35 and 36 are all arranged in fixed positions with respect to the transparent screen 38.

The basic function of the rear-projecting system is that the light receiving mixing rod 32 has been adapted to receiving light from a light source 30. Light received from the said light source 30 is distributed via the optical fibers 33 to the remaining part of the system. The transport of light through a limited number of fibers implies that the light source 30, the optical filter 31 and the mixing rod 32 can be located in a remote location and thus facilitate easy access to the most vulnerable parts of the system, i.e. the light source 30 and the supporting electronics. Hence, necessary maintenance has been made easy as has the mounting. The light-emitting ends of the fibers 33 form optical plugs 34 in fixed positions relative to the housings 35 and 36. Each optical plug 34 comprises injection optics 40 arranged in such a manner that light emitted from the optical plug is distributed uniformly over the light modulators of the above-mentioned spatial light modulator array 41. The spatial light modulating array is controlled by means of controlling signals established on the basis of a control signal input (not shown).

The basic optical element of the individual modules of the system will now be illustrated with reference to FIG. 4B.

Light emitted from the light-emitting end of an optical fiber 33 is collimated by means of collimating lenses 40.

The collimated light is transmitted through a transmissive spatial light modulator 41 and a projecting lens means 42 to the transparent screen 38 via the color wheel 37. The spatial light modulator of the illustrated preferred embodiment of the invention comprises 588 individually controlled shutters. Obviously, other kinds of spatial light modulating arrays may be utilized. The mechanical structure and the injection optics of the module should of course be adapted accordingly.

The image generated by the spatial light modulating array 41 is projected onto the transparent screen 38 by the projection lens 42. The transparent screen 38 is provided with optical power and diffuser properties in order to control the viewing angle of the device. The magnification of the image is controlled only by the power of the transparent screen 38 so that this screen is the only item to be replaced, if another magnification is desired.

It should be noted, that the individual light modulating modules should be in a quite accurate position relative to the screens 38 due to the fact that the focal point of each screen should match the center of the light modulating system in order to obtain a homogenous illumination of the area formed by all the combined screens 38.

Hence, the optical axis of each screen should coincide with the corresponding light modulating arrangement.

Optionally, a diffuser on the projecting screen may be omitted when the focal plane is suitably displaced.

Turning now to FIG. 4A, the spatial light modulator array 41 and the color wheel 37 control the image characteristics. Pulse width modulation of the spatial light modulator array 41 controls the average intensity illuminated by a given pixel. If the color wheel 37 is used, the pulse width modulation of the spatial light modulator array 41 which is synchronized with the rotation of the color wheel 37, will control the color of a given pixel. Finally, the pulse width modulation of the spatial light modulator array 41 can be used to correct luminance variation on the screen due to a non-uniform density of pixels on the screen.

The elements in FIG. 4B, 33–42, and the housings 34, 35 and 36, comprise one module. Several modules may be combined into an illuminating arrangement so that a given size of display can be achieved by combining the necessary number of modules. Each module thus illuminates a subpart of the given illumination area. The entire illumination area can be protected from environmental exposure by a protecting screen 39 which is identical in size with or larger than the entire illumination area. Appropriate programming of a control unit controls the illumination of each sub-area. The control unit itself may be controlled by remote.

Turning again to FIG. 3A, some important features of the choice of light source 30 will be explained.

An optical system can be characterized by the quantity etendue which describes the optical size of a light beam. The etendue is given by $E = A \cdot \Omega$.

$$E = A \cdot \Omega$$

where A is the area of a light beam, normal to the direction of propagation and $\Omega$ is the solid angle included by the beam.

In general, etendue is invariant in a loss less optical system. This implies that the etendue calculated at one place in the optical system can be translated to other places in the optical system, i.e. there is a system etendue for the optical system. In other words $A_1 \cdot \Omega_1 = A_2 \cdot \Omega_2$. The collection efficiency by a given lamp system, i.e. the bulb and the reflector, depends on the system etendue. In case the lamp etendue is large, only a fraction of the light from the light source can be collected by the optical system compared to the fraction between the system etendue and the lamp etendue.

According to the illustrated preferred embodiment of the invention, the spatial light modulating array 41 determines the system etendue which means that the system etendue is fixed. Hence, the shutters with relatively small holes in the applied spatial array represents the area $A_2$. Consequently, due to the small dimension of the modulation channels, it is necessary to use a lamp with a low etendue to optimize the collection efficiency. This may be described as the concept of luminance which is defined as emitted luminous flux per unit solid angle per unit area to be maximized.

The desired optimization may be obtained by using a high luminance light source having a very small area, i.e. a small hot spot. A possible choice of a lamp may be a relatively high powered AC short arc gap lamp having e.g. a 100–300 W light bulb.

Moreover, forced air cooling of the light source should be applied (not shown).

A preferred commercially available lamp should preferably have an average life time of at least 2000–4000 hours.

It should moreover be noted that the applied fibers should naturally be optimized correspondingly in order to obtain an optimized system performance. Turning now to FIG. 5A, a further configuration of a rear-projecting system is provided. When using the preferred light modulator, each having 588 modulation channels on the wafer, a hexagonal shutter structure is preferable. Hence, the spatial light modulators form a hexagonal illumination area. FIG. 5 illustrates a dimensioned transparent screen 51 corresponding to the transparent screen 38 of FIG. 4A. The hexagonal shape of the shutter arrays and the illumination area represents a very advantageous exploitation of the circular beam profile emitted by the light-emitting ends of the optical fibers.

A rear projecting sign according to the invention having a size of approximately 1 m×1 m requires sixteen of the above-mentioned shutter arrays. Each shutter array may provide a modulated illumination area of an inscribed circle of Ø 196 mm.

Figure 5:
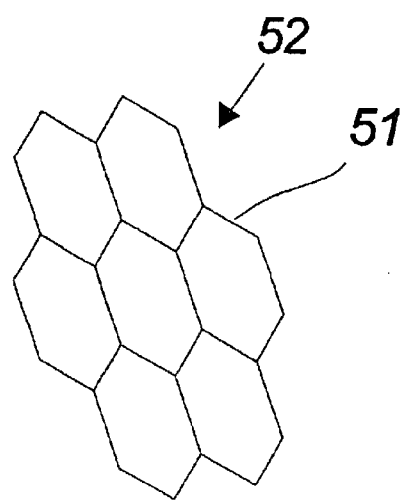
FIG. 5 illustrates a screen configuration according to the invention.
Figure 6:
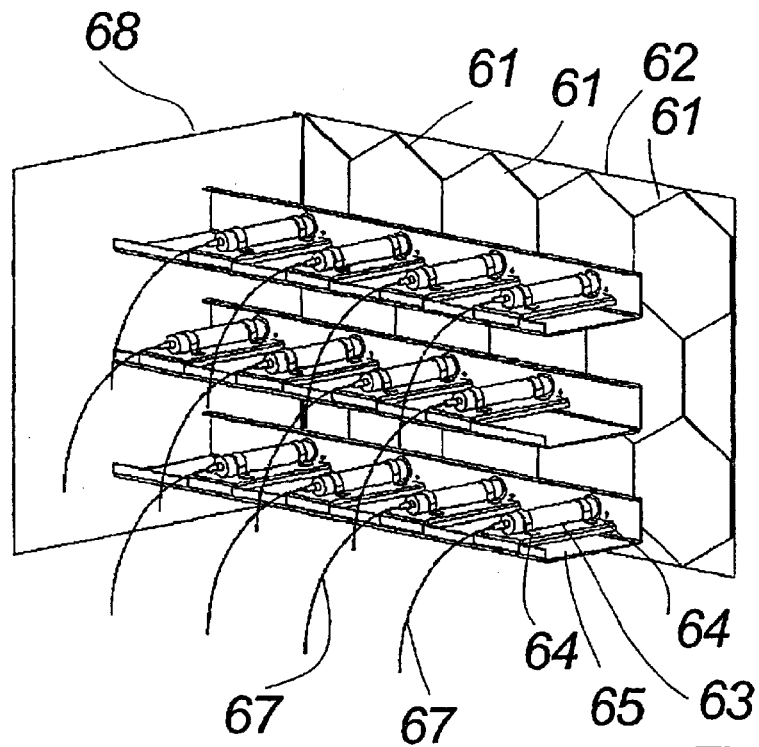
FIG. 6 illustrates a sub-section of a traffic sign according to the invention illustrated in FIG. 5.

FIG. 6 illustrates the rear projecting system illustrated in FIG. 5 in which the illumination screen is formed by a number of hexagonal screens 61. Each screen is mounted on a protective screen 62. The protective screen may typically be made of glass.

Corresponding spatial light modulating modules 63 of the above-mentioned type are mounted with clamps 64 on brackets 65. The modulators are optically fed by means of optical fibers 67. Each module is carefully positioned relative to each corresponding screen 61 in such a manner that the focal point of the screens 61 are coinciding.

The modules are all mounted within a housing 68 (partly shown). The housing protects the contents against dust, rain, etc. A possible choice of closeness may be IP64.

If appropriate, the controlling electronics may be incorporated in the housing, or of course at a distant position, e.g. in the light housing.

It should be noted that the screens 61 are typically made of acrylics having suitable optically properties.

The individual mounting of the screens 61 on the protective screen 62 ensures that expansion or shortening in dimension of the acrylic screens 6 due to temperature variations is restricted to only one screen 61. Hence, the projection of the modulated light onto the screen is maintained even under relatively extreme temperature conditions. Evidently, a slight margin between the screens will offer some expansion possibilities.

The modules are mounted in such a manner that the maximum non-illuminated distance between the screens 61 is less than five mm. The number of modules may be adapted to fit the purpose.

It should be noted that the brackets 65 and the basic mechanical components of the sign are typically made of materials having properties quite different from those of the screens 61. When fixating and centering the screens 61 with respect to each corresponding spatial modulator arrangement, a suitable protection of the screens 61 is obtained more or less independently of ambient temperatures.

Figure 7:
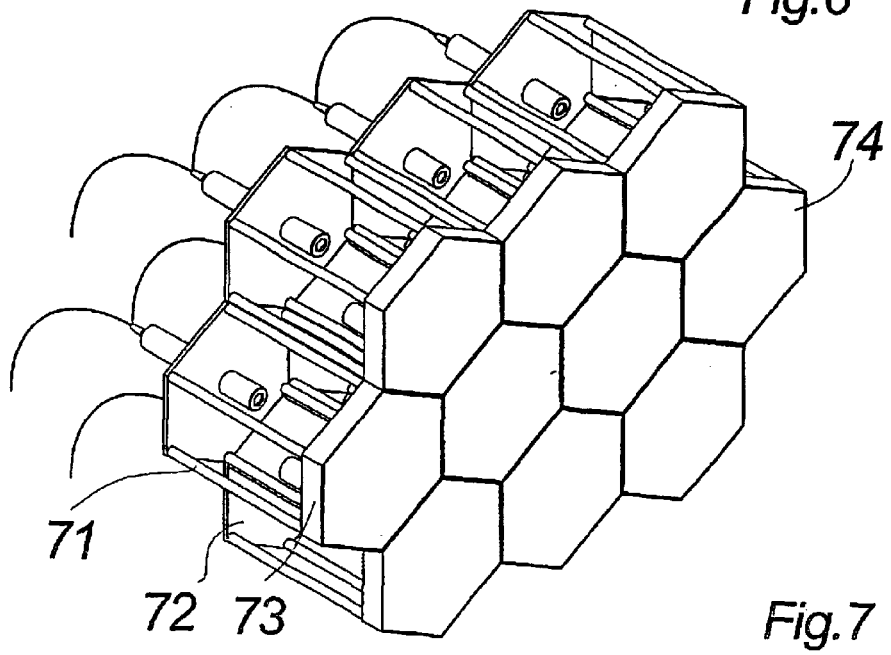
FIG. 7 illustrates a module housing according to the invention and FIGS. 8 and 9 illustrate a rear projection arrangement using a DMD as spatial light modulator.
Figure 8:
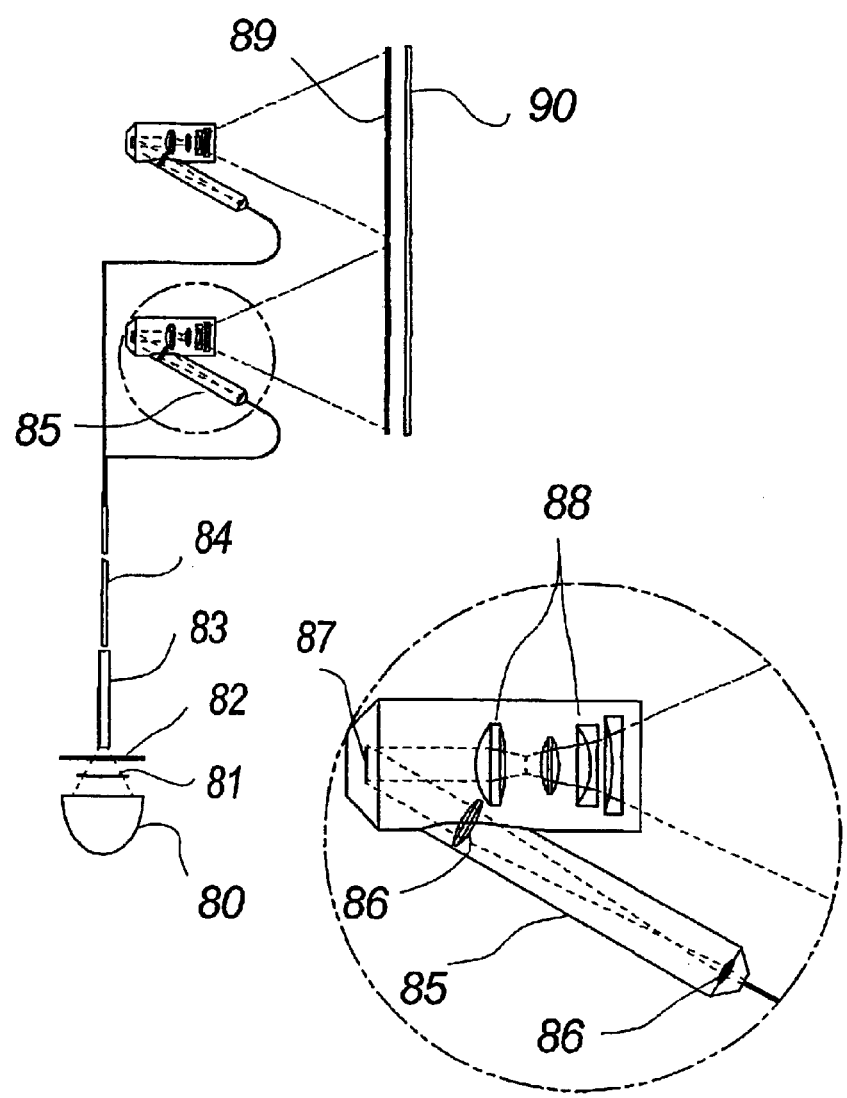
Figure 9:
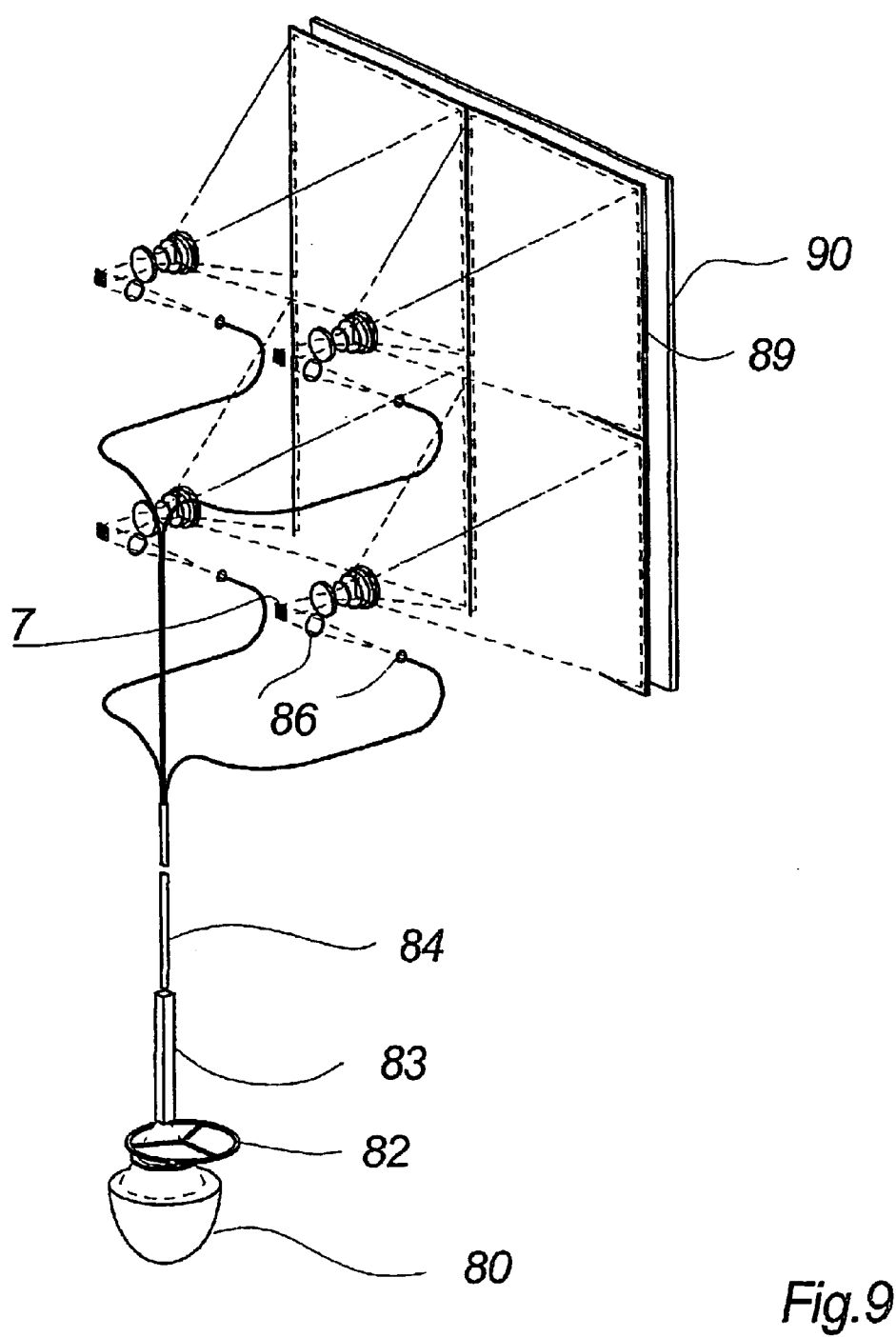

FIG. 7 shows an example of a hexagonal sized module 71 according to the invention.

The module 71 comprises a rear mounting frame 72 and a front mounting frame 73.

The front mounting frame is adapted to receiving a transparent screen 74. The individual modules may be fitted together forming a screen as explained in the FIG. 5.

The module 71 may be regarded as a closed unit while the projecting device of FIG. 6 may be regarded as a somewhat open system. A closed system of housings 71 offers an advantageous fixation of the projection screen 74 and the corresponding spatial modulating system due to the fact that both are fixated to the module 71. The optical properties of the screen are designed to carefully match a spatial light modulating array (not shown) mounted in the housing. The screen may e.g. be made of acrylics, as changes in the acrylic due to e.g. temperature variations may be isolated to affect one module only. Moreover, individual module 71 may easily be replaced as the mounted screen 74 and the corresponding modulators may be permanently calibrated in the manufacturing laboratory.

Any suitable type of spatial light modulator arrays may be utilized according to the invention such as DMD.

A further advantageous degree of compactness may be obtained when utilizing illumination sources in the form of e.g. optical fiber ends, as such a fiber ends may be unplugged and plugged into the housing by a simple operation.

Evidently, the mechanical and optical properties of such a plug have to be designed carefully in order to prevent misalignment.

Moreover, the hexagonal housing 71 offers a high degree of compactness due to the fact, that the screens fit the surface shapes of the other screens while also being advantageous geometrically in respect of the modulator array and a corresponding light source.

What is claimed is:

1. A rear projecting device comprising:
a light guide for distribution of light from a light source to a light-projecting area via a spatial light modulator arrangement,
wherein said light modulating arrangement is arranged in relation to said light-projecting area such that said arrangement illuminates an area of said light-projecting area, said light projection area being at least partly transparent, and wherein the spatial light modulator arrangement comprises a DMD light modulator.

2. The rear-projecting device according to claim 1, wherein said light guide comprises optical fibers.

3. The rear-projecting device according to claim 2, wherein said optical fibers comprise multi-mode fibers.

4. The rear-projecting device according to claim 1, wherein said light-projecting area comprises at least two screens.

5. The rear-projecting device according to claim 1, wherein said light-projecting area is protected by a protective screen.

6. The rear-projecting device according to claim 1, wherein said light guide comprises a plurality of light guides and the light from the light source is distributed to said plurality of light guides via a mixing rod such that each of said plurality of light guides receives a same amount of light.

7. The rear-projecting device according to claim 1, wherein said light guide comprises a plurality of light guides and the light from the light source is distributed to said plurality of light guides via a filter means such that each of said plurality of light guides, receives a same amount of light.

8. The rear projection device according to claim 1, wherein the spatial light modulating arrangement comprises a micro-mechanical transmissive shutter array.

9. The rear-projecting device according to claim 1, wherein the light source comprises a short arc lamp.

10. The rear-projecting device according to claim 9, wherein the light source comprises an arc of less than 3 mm.

11. The rear-projecting device according to claim 9, wherein luminance of light modulated by the spatial light modulator arrangement is controlled by a variation in duty cycle.

12. A traffic sign comprising:
a rear-projecting device including a light guide for distribution of light from a light source to a light-projecting area via a spatial light modulator arrangement, said spatial light modulating arrangement being arranged in relation to said light-projecting area such that said arrangement illuminates an area of said light-projecting area, said light projection area being at least partly transparent, and wherein the spatial light modulator arrangement comprises a DMD light modulator.

13. A rear-projecting device comprising:

a plurality of light emitters arranged for illumination of a light-projecting area comprising a front side and a rear side via at least two spatial light modulating arrangements;

wherein said spatial light modulating arrangements are arranged in relation to the light-projecting area such that each of said arrangements illuminates a sub-area of said light-projecting area, said light projection area being at least partly transparent, and wherein the spatial light modulator arrangement comprises a DMD light modulator.

14. The rear-projecting device according to claim 13, wherein said light emitters comprise light sources.

15. A rear projecting arrangement comprising:

a light input;

a spatial light modulator arrangement; and a light projecting area;

wherein said spatial light modulator arrangement includes a spatial light modulator having a plurality of electrically controllable shutters controlling the projecting of light to an effective light projecting area, said spatial light modulating arrangement having a modulator dimension (D) in a given direction of the arrangement, said effective light projecting area having a projecting dimension (d) of the projected light in a corresponding direction, said modulator dimension (D) being a maximum distance between two shutters of the modulator arrangement in the direction, where D>d/20, and wherein the spatial light modulator arrangement comprises a DMD light modulator.

16. The rear projecting arrangement according to claim 15, wherein D>6 cm and D is a minimum extension of the spatial modulating arrangement.

17. The rear projecting arrangement according to claim 15, wherein D is greater than d/4.

* * * * *